United States Patent Office 3,426,402
Patented Feb. 11, 1969

3,426,402
AUTOMATIC PREFORMING DEVICE FOR CONTINUOUS POTTERY FORMING MACHINE
Isao Matsushima, Nagoya-shi, Japan, assignor to Nippon Toki Kabushiki Kaisha, Nagoya-shi, Aichi-ken, Japan, a corporation of Japan
Filed Dec. 28, 1966, Ser. No. 605,344
Claims priority, application Japan, May 19, 1966, 41/31,478
U.S. Cl. 25—22    3 Claims
Int. Cl. B28b 1/00; C11d 13/16

ABSTRACT OF THE DISCLOSURE

This disclosure relates to an automatic preforming device for continuous pottery forming machine. More specifically, the disclosure relates to a device for cutting the rolls of clay to slabs of clay each about equal in amount to the article to be shaped, preforming the bats, and then replacing the bats thus formed onto molds.

---

The present disclosure provides an automatic preforming device for the continuous pottery forming machine wherein the improvement comprises a rotary drum adapted to be intermittently revolved and stopped, spindles disposed radially of the axis of the drum, equidistantly around the circumference of said drum, rotary spreader disc supported by said spindles, means for delivering slabs of clay to said rotary spreader disc in one stop position of the rotary drum, means for spreading the slabs of clay on said rotary spreader disc in the next stop position of the rotary drum, and means for stripping off the bats on the rotary spreader disc in another stop position of the rotary drum.

This invention relates to an automatic preforming device for continuous pottery forming machine. More specifically, the invention relates to a device for cutting the rolls of clay to slabs of clay each about equal in amount to the article to be shaped, preforming the bats, and then replacing the bats thus formed onto molds.

Conventional preforming processes have had disadvantages in that they involve eccentric spreading of the slabs of clay with the consequent nonuniformity in configuration and dimensions of the moldings and that the spreading devices used occupy unduly large spaces.

The foregoing disadvantages are eliminated by the present invention, which has for its object the provision of a device which can hold slabs of clay cut to desired amounts, feed the slabs of clay with their centers aligned to the centers of rotation of rotary spreader disc, without the possibility of off-center spreading of the slabs of clay with spreading tool, thus facilitating the manufacture of moldings having improved configurations, and which requires only a limited space as compared with those needed by the conventional devices which use chain belts as means for feeding slabs of clay.

The present invention provides an automatic preforming device for the continuous pottery forming machine which comprises a rotary drum adapted to be intermittently revolved and stopped, spindles disposed radially of the axis of the drum, equidistantly around the circumference of said drum, rotary spreader disc supported by said spindles, means for delivering slabs of clay to said rotary spreader disc in one stop position of the rotary drum, means for spreading the slabs of clay on said rotary spreader disc in the next stop position of the rotary drum, and means for stripping off the spread bats on the rotary spreader disc in another stop position of the rotary drum.

Figure 1:
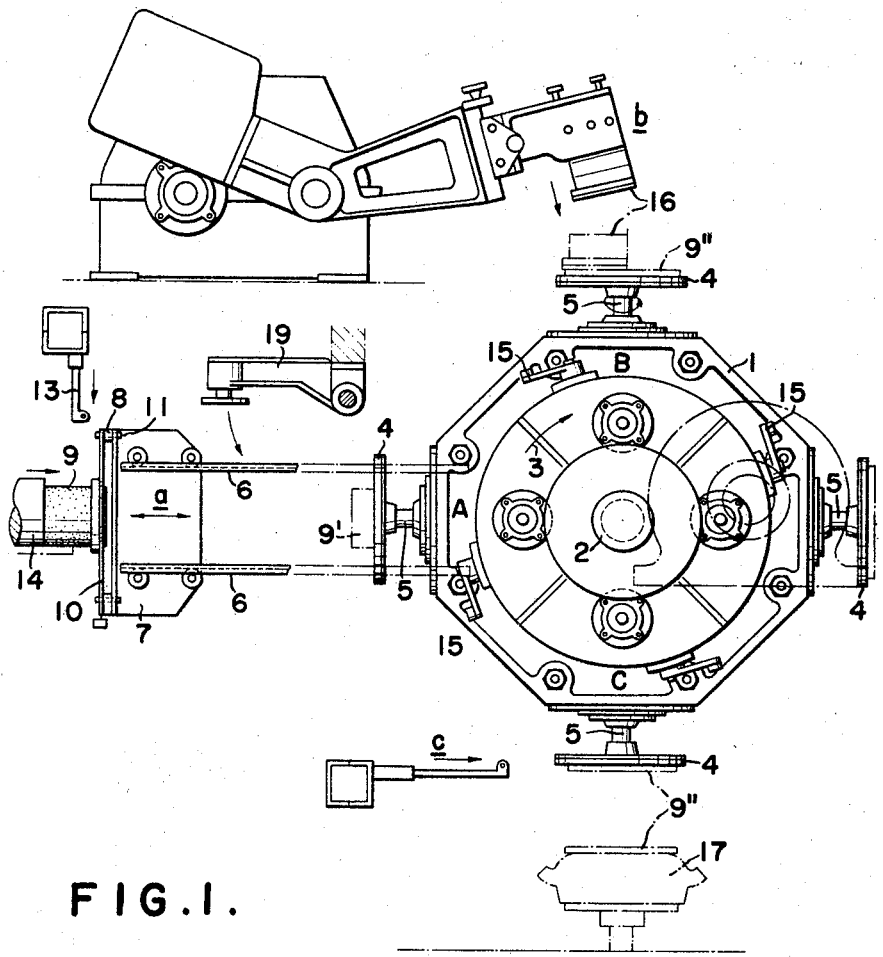
Figure 2:
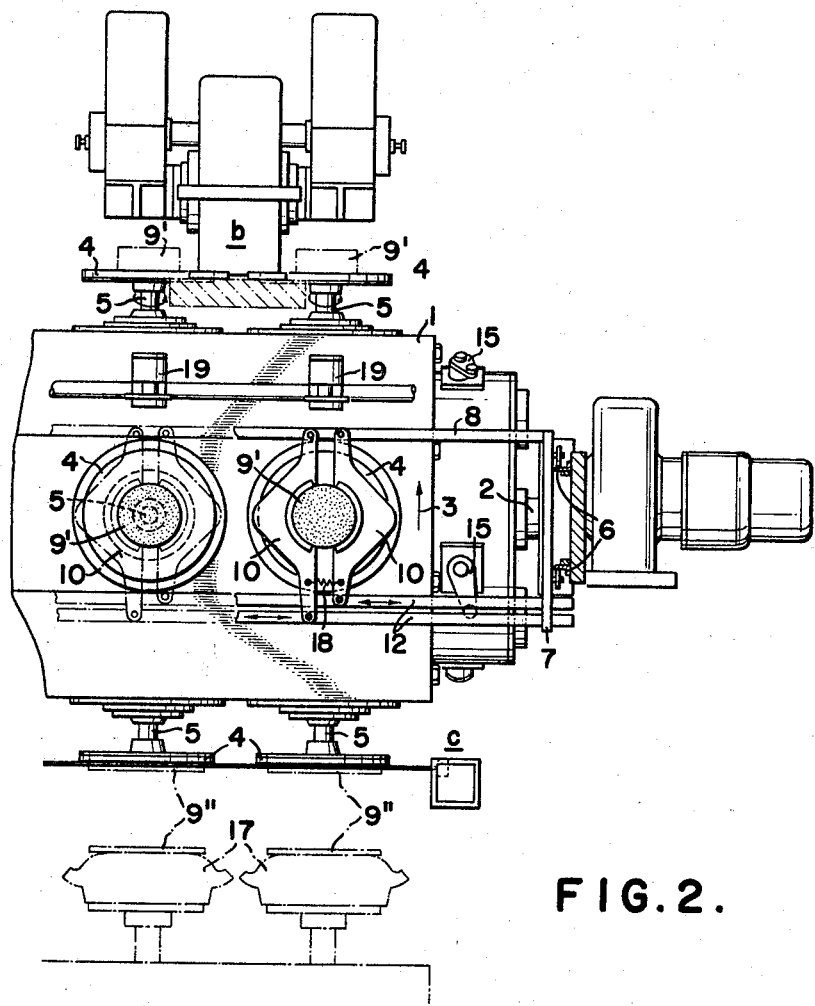

Other objects and advantages of the invention will become apparent from the following detailed description taken in conjunction with the accompanying drawings, in which:

FIGURE 1 is a front elevation of a preferred embodiment of the invention; and
FIGURE 2 is a side elevation of a part of the device shown in FIGURE 1.

Referring to the drawings, a rotary drum is generally indicated at 1. It is adapted to be intermittently revolved and stopped around its axis 2 in the direction of an arrow 3 by any known means. Above the outer periphery of the rotary drum 1, rotary spreader discs 4 for slabs of clay are supported by equidistantly disposed spindles 5 which have their axes at right angles to the circumferential surface of the rotary drum, i.e. the spindles 5 are arranged radially of the axis of said rotary drum 1. The rotary spreader discs 4 for slabs of clay and the spindles 5 are shown, respectively in sets of four. Plural numbers of rotary spreader discs 4 and spindles 5 are arranged linearly in the direction parallel to the axis of the rotary drum 1. In FIGURE 2, the spreader disc and spindles are shown in two rows.

In one of the intermittent stop positions of the rotary drum 1, i.e. in the position A (in FIGURE 1), a slab of clay delivering means $a$ is disposed opposite to rotary spreader disc 4. The delivering means $a$ includes rails 6, 6 in the direction normal to the plane of the rotary spreader disc in the position A, and a housing 7 guided therealong. On the housing 7 there is provided a horizontal support rod 8, which rotatably supports the top ends 11 of a pair of holders 10, 10 for holding a slab of clay of a certain amount 9' cut off from roll of clay stock 9 supplied by a clay feeder to be described hereinafter. The lower ends of the holders 10, 10 are secured, respectively, to two horizontal sliding rods 12, 12 which are horizontally slidable toward the directions apart from each other. Between the lower ends of the holders 10, 10, there is stretched a spring 18 so that, when the pulling of the sliding rods 12, 12 toward the opposite horizontal directions is released, the spring 18 can contract thereby permitting the holders 10, 10 to hold a slab of clay 9' therebetween. A cutter 13 is disposed ahead of and above the holders 10, 10 in their positions on the front ends of the rails 6, 6. Also, in front of the holders 10, 10, a clay feeder 14 is disposed.

The roll of clay stock 9 supplied by the clay feeder 14 is urged into the space between the holders 10, 10 which are positioned on the front ends of said rails 6, 6. As the roll of clay in the space reaches a predetermined amount, the cutter 13 is actuated to cut off the certain amount of roll of clay 9 so that a slab of clay 9' can be held by the holders 10, 10.

Next, the holders 10, 10, while holding the slab of clay 9' therebetween, recede along the rails 6, 6, together with the housing 7, until they stop with the center of the slab of clay 9' matched to the center of rotation of the rotary spreader disc 4.

In front of and above the rotary spreader disc 4, a tamper 19 is rotatably disposed in such manner that when it is turned downward the tamper 19 tamps at its front end the slab of clay 9' against the rotary spreader disc 4 so that the slab of clay sticks completely to the latter disc. Then, the tamper 19 is turned upward to its original position, and the sliding rods 12, 12 are moved laterally apart from each other thereby to open the holders 10, 10 and bring the housing 7 back to its original frontal position.

A clutch change-over lever 15 is mounted on the rotary drum 1 in such way that it can operate in the subsequent intermittent stop position B of the rotary drum 1 (in FIGURE 1). As the clutch change-over lever 15 is actuated, the rotary spreader disc 4 in the position B can be turned. Above the spreader disc 4 there is provided a spreader means *b*, which includes a spreading tool 16 rotatably supported opposite to said spreader disc 4. By the action of a cam or the like, the spreading tool 16 is turned downward until it presses and spreads the slab of clay 9' on the spreader disc 4. On completion of the spreading, the spreading tool 16 turns upward to its original position.

A mold 17 is arranged below the rotary spreader disc 4 in the further intermittent stop position C (in FIGURE 1) of the rotary drum 1. Also, a stripping means *c* is disposed on a side of the spreader disc 4. The bat 9" spread in the position B is stripped off from the spreader disc 4 by the action of the stripping means *c* and is at the same time fed onto the mold 17.

Next, the operation of the embodiment as above described of the present invention is explained hereunder.

Roll of clay stock 9 is supplied by the clay feeder 14 into the space between the holders 10, 10 positioned on the front ends of the rails 6, 6. As the roll of clay 9 reaches a predetermined amount, the tension pulling the sliding rods 12, 12 toward the lateral directions opposite to each other is released, and by the consequent contraction of the spring 18 the roll of clay is held by the holders 10, 10 and then is cut off by the cutter 13. Next, while the slab of clay 9' thus cut off is being held in position, the housing 7 is allowed to receded along the rails 6, 6, and the tamper 19 is turned to tamp the slab of clay 9' so that the slab of clay 9' can completely stick to the spreader disc 4 and then the tamper 19 is brought back to its original position.

Subsequently, when the rotary drum 1 has been revolved until the rotary spreader plate arrives at the position B, the drum stops. At this time, the clutch changeover lever 15 is actuated to rotate the rotary spreader disc 4 on the spindle 5. Then, the spreading tool 16 is pressed against the slab of clay 9' on the spreader disc 4 thereby to spread the slab of clay to the form of a bat. After the slab of clay 9' has been spread, the spreading tool 16 is returned to the original position.

Then, the rotary drum 1 is turned and stopped when the rotary spreader disc 4 has reached the position C. At this time, the stripping means *c* is actuated to strip off the bat thus stretched to shape 9" from the rotary spreader disc 4 and to feed it onto the mold 17.

By the subsequent revolution and stopping of the rotary drum 1, the rotary spreader disc 4 reaches the position A and thus repeats the cycle as above described.

What is claimed is:

1. An automatic clay preforming means for use in a continuously operable pottery forming machine, comprising: an intermittently rotatable drum mounted about a horizontal axis, a plurality of spindles rotatably mounted about respective axes extending radially of said horizontal axis and equi-distantly spaced circumferentially along said drum, a flat spreader disc mounted on each said spindle, clay holding means positioned radially outward of said drum at a point whereby each of said spreader discs successively becomes aligned with said clay holding means when said drum stops pursuant to the aforementioned intermittent rotation thereof, a clay feeding means adapted to feed a bulk amount of clay to said clay holding means, a clay cutting means adapted to cut a slab of clay from a bulk amount thereof held between said holding means and said feeding means, said holding means being radially reciprocable relative to the horizontal axis of said drum whereby said holding means is adapted to reciprocate between said clay holding means and a said disc on said drum, a clay tamping means adapted to tamp a slab of clay against a said disc while the latter is radially aligned with said holding means, a spreading means arranged to coact with each said disc successively pursuant to said drum rotating a said disc from a first position aligned with said holding means to a second position angularly displaced from the first one, a stripping means adapted to strip the clay from said discs when the latter are rotated by said drum to a third position angularly displaced from said first and second positions.

2. The preforming means of claim 1, wherein said holding means comprises a pair of holding members having opposite ends, one end of each member being pivoted about a fixed axis and the other end of each member being attached to means for pivoting said members in respective opposite directions relative to each other whereby they can grip a clay slab therebetween when pivoted towards each other and release same when pivoted away from each other.

3. The preforming means of claim 1, said drum carrying four of said spindles successively ninety degrees disposed relative to each other, said drum being rotatable in ninety degree steps, said holding means being circumferentially positioned relative to the drum rotation between said third position and said first position.

References Cited

UNITED STATES PATENTS 1,769,528    7/1930    Miller _____ 25—22 X
3,245,130    4/1966    Dowley et al. _____ 25—22 X

OTHER REFERENCES

German printed application 1,151,087, July 1963, Tackmann, class 25–7.

J. SPENCER OVERHOLSER, *Primary Examiner.*

JOHN S. BROWN, *Assistant Examiner.*

U.S. Cl. X.R.

25—9, 1